(No Model.)
W. T. MESSINGER.
COMBINED PIPE COUPLING AND CHECK VALVE OR CHAMBER.
No. 383,428. Patented May 22, 1888.
Fig. 1.
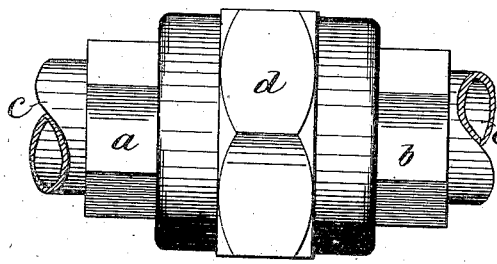
Fig. 2.
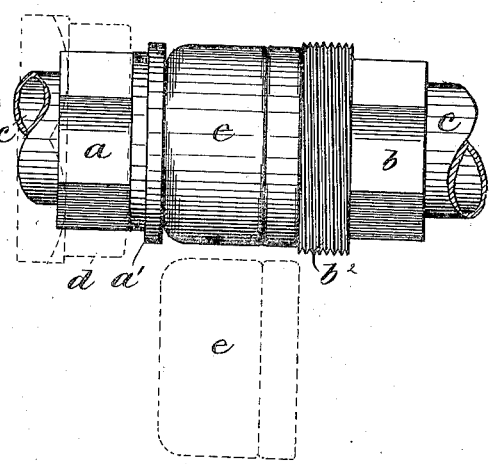
Fig. 3. Fig. 4. Fig. 5.
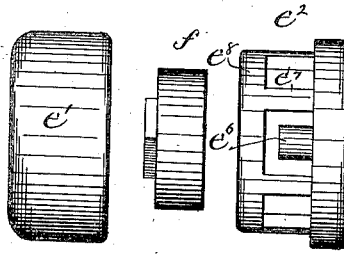 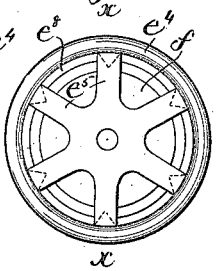 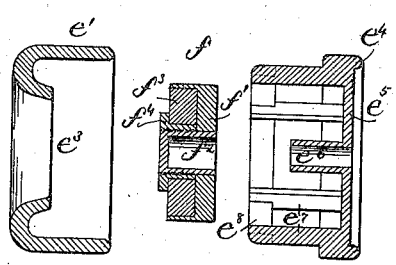
Fig. 7. Fig. 8. Fig. 6.
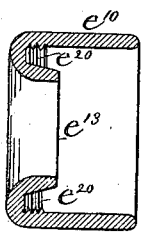 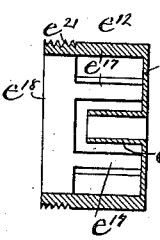 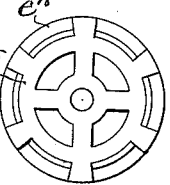 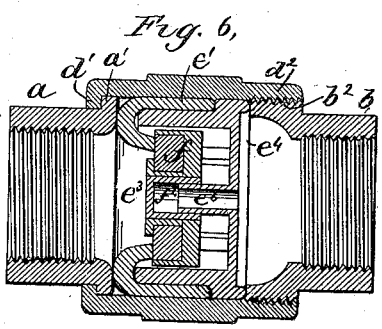
Witnesses,
Jas. J. Maloney.
B. G. Stalker
Inventor,
Wm. T. Messinger,
by Jos. P. Livermore
Att'y.

UNITED STATES PATENT OFFICE.

WILLIAM T. MESSINGER, OF CAMBRIDGE, MASSACHUSETTS, ASSIGNOR TO GEORGE T. POWER, OF CHICAGO, ILLINOIS.

COMBINED PIPE-COUPLING AND CHECK VALVE OR CHAMBER.

SPECIFICATION forming part of Letters Patent No. 383,428, dated May 22, 1888.

Application filed May 23, 1887. Serial No. 239,090. (No model.)

*To all whom it may concern:*

Be it known that I, WILLIAM T. MESSINGER, of Cambridge, county of Middlesex, State of Massachusetts, have invented an Improvement in a Combined Pipe-Coupling and Check Valve or Chamber, of which the following description, in connection with the accompanying drawings, is a specification, like letters on the drawings representing like parts.

My invention relates to a device—such, for example, as a check-valve—to be used in piping; and the object of the invention is to produce a compact and efficient coupling and valve or other device that can be removed when required without disturbing any of the pipe-connections.

In Letters Patent No. 346,600, granted to me August 3, 1886, I have shown and described a check-valve comprised in a valve-casing provided with external screw-threads at either end, and adapted to be connected with the pipe at either side by two coupling-nuts co-operating with the said screw-threads, by which construction the valve-casing and valve can be removed without disconnecting the piping.

In the present invention a single coupling-nut is employed co-operating with a flanged coupling-piece at one end and a threaded coupling-piece at the other end; but the said nut, instead of drawing the two coupling-pieces into contact with one another or with an interposed packing-ring, as commonly practiced, is prolonged, so that the coupling-pieces are separated by a considerable space, and an independent chamber is interposed between the said coupling-pieces and inclosed within the coupling-nut, so that when the latter is unscrewed and slipped back over the flanged coupling-piece the said chamber may be removed laterally from between the two coupling-pieces and subsequently replaced, without disturbing the connection of the coupling-pieces with the piping or any of the connections of the piping itself. The said chamber is made in two parts, one provided with a valve-seat and the other with a valve guide, and contains the valve which co-operates with the said seat.

Figure 1 is a side elevation of a check-valve embodying this invention, with all the parts in operative position; Fig. 2, a side elevation of the coupling-piece and removable valve-chamber, with the coupling-nut unscrewed and slipped back, so that the valve-chamber may be withdrawn, as indicated by dotted lines; Fig. 3, a side elevation of the two portions of the valve-chamber and valve separated, as may be required for the purpose of inspection or repairing; Fig. 4, an end view of the valve-chamber, as seen looking toward the outlet end; Fig. 5, a central longitudinal section on line $x\ x$, Fig. 4, of the two parts of the valve-chamber and the valve; Fig. 6, a longitudinal section of the coupling and inclosed parts; Fig. 7, a sectional view similar to Fig. 5, showing a modified construction of the two-part valve-chamber adapted to operate with a valve similar to that shown in Fig. 5; and Fig. 8, an end view of the valve-chamber shown in Fig. 7.

The device comprises two coupling-pieces, $a\ b$, adapted to be connected with piping $c$ by screw-threads or in any other suitable or usual manner, and a coupling-nut, $d$, co-operating with the said coupling-pieces $a\ b$ in substantially the usual manner, being provided at one end with an inwardly-projecting flange, $d'$, (best shown in Fig. 8,) co-operating with an outwardly-projecting flange, $a'$, on the coupling-piece $a$, and being provided at its other end with a screw-thread, $d^2$, co-operating with a screw-thread, $b^2$, on the coupling-piece $b$. Instead, however, of operating to draw the ends of the coupling-pieces $a\ b$ tightly against one another, or against an interposed washer or packing-ring, the said nut $d$ is lengthened and has a cylindrical bore between the flange $d'$ and threaded part $d^2$, which receives within it an independent removable chamber, $e$, which is interposed between the coupling-pieces $a\ b$, as shown in Figs. 2 and 8, so that when the coupling-nut is turned up tight the coupling-pieces are jammed against the ends of the said removable chamber, instead of against one another. The ends of the said chamber are shown as rounded where they engage the flat ends of the coupling-pieces, so that a tight joint is produced by the pressure of the said coupling-piece against the ends of the chamber.

The construction of the valve-chamber $e$ and the inclosed valve which is believed to be best for all uses to which the valve may be put is represented in Figs. 3, 4, 5, and 6, said chamber being made in two parts, $e'$ $e^2$, the part $e'$ being provided with a valve-seat, $e^3$, (see Fig. 5,) which seat projects inward and forms a raised annular surface to receive the valve proper, $f$. The other portion, $e^2$, of the valve chamber consists of an annular ring or frame, $e^4$, provided with arms, or a spider-frame, $e^5$, (see Fig. 4,) that supports a central guide projection, $e^6$, that co-operates with a central guide-passage, $f^2$, (see Fig. 5,) in the valve $f$. The said ring $e^4$ is also connected by a series of longitudinal arms or ribs, $e^7$, with another ring, $e^8$, and the outer surface of said arms $e^7$ and ring $e^8$ are finished to fit within the main portion $e'$ of the valve-chamber, while the inner edges of the arms $e^7$ embrace the valve $f$ and may assist the guide $e^6$ in supporting the said valve, or might, if desired, be depended upon wholly to support and guide the valve, which can play back and forth between the seat and the spider-frame $e^5$. When the valve is unseated, a sufficient passage for the fluid is provided around the outside of the valve and between the arms $e^7$ and $e^5$.

The construction of the valve proper is best shown in Fig. 5, the same consisting of a brass or metal body, $f'$, having an annular groove to receive a ring of soft or packing material, $f^3$, which may be secured in the said groove by an annular nut, $f^4$, screwed upon the outside of the guide-passage $f^2$.

In putting the parts together the valve $f$ is placed with the guide-passage $f^2$ over the projection $e^6$, and the part $e^2$ of the valve chamber then inserted in the part $e'$, and then when the said valve-chamber is clamped between the coupling-pieces $a$ $b$, as shown in Fig. 2, there is no possibility of the valve getting out of place.

The only function of the ring $e^8$ is to support the guide-ribs $e^7$, and as the guide $e^6$ might, if desired, be depended upon wholly to support and guide the valve, the said ring $e^8$ might be omitted, or the space between the guide-ribs might be filled, so that the part $e^7$ $e^8$ would form a cylindrical shell, the only object in making the spaces being to reduce the amount of metal and afford a freer passage for the fluid.

The end of the chamber $e'$ is rounded, and the abutting portion of the ring $e^4$ is flat, so as to form a tight joint when the parts are pressed together.

In the construction shown in Figs. 6 and 7 the main portion $e^{10}$ of the valve-chamber is provided with an inwardly-projecting seat, $e^{13}$, substantially like that before described, and the said portion $e^{10}$ is made to fill the entire space between the coupling-pieces $a$ $b$, and is provided with internal screw-threads, $e^{20}$, that co operate with external screw-threads, $e^{21}$, on the ring $e^{18}$ of the cage or frame $e^{12}$ that supports the guides of the valve.

The cage or frame $e^{12}$ is composed of longitudinal arms or ribs $e^{17}$, connected at one end with the ring $e^{18}$, and at the other end with an open frame or spider, $e^{15}$, that supports the valve-guide $e^{16}$, said cage co-operating with a valve of similar construction to that shown in Fig. 5 in substantially the same way as described in connection with Fig. 5, and differing from the valve-supporting portion $e^2$, in that it is secured in the main portion $e^{10}$ by the screw-threads $e^{20}$ $e^{21}$, instead of being clamped therein by the coupling-pieces $a$ $b$, which in the construction shown in Fig. 6 bear against the ends of the main portion $e^{10}$, instead of bearing at one end against the said main portion and at the other end against the valve supporting and guiding portion.

Any form or material of valve may be employed which may be best adapted to the uses and the fluids for which the valve is to be used, and any method may be employed for guiding or controlling a valve to engage a valve-seat in combination with a removable chamber and coupling nut and pieces.

I claim—

1. The combination of a pair of coupling-pieces and a co-operating coupling-nut with an independent chamber inclosed within the said coupling-nut and engaged at its ends by said coupling-pieces, being laterally removable from between said coupling-pieces without separating them, the said chamber consisting of two parts, one provided with an inwardly-projecting valve seat and the other with a central valve guide, and a valve inclosed within said parts and co operating with said valve seat and guide, substantially as described.

2. The combination of a pair of coupling-pieces and a co-operating coupling-nut with an independent removable chamber engaged at its ends by said coupling-pieces and inclosed within the said coupling-nut, the said chamber being composed of a main part, $e'$, having an internal valve-seat, and a valve-guiding part, $e^2$, composed of a ring, $e^4$, an open frame, $e^5$, a valve-guide, $e^6$, and a portion fitting within the said main portion $e'$, substantially as and for the purpose set forth.

In testimony whereof I have signed my name to this specification in the presence of two subscribing witnesses.

WM. T. MESSINGER.

Witnesses:
  JOS. P. LIVERMORE,
  JAS. J. MALONEY.